(12) United States Patent
Hilton (10) Patent No.: US 7,793,069 B2
(45) Date of Patent: Sep. 7, 2010

(54) INDEXING FOR DYNAMIC ADDRESS TRANSLATION

(75) Inventor: Ronald N. Hilton, Holladay, UT (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 11/613,995

(22) Filed: Dec. 20, 2006

(65) Prior Publication Data

US 2008/0155225 A1 Jun. 26, 2008

(51) Int. Cl.
*G06F 12/00* (2006.01)
(52) U.S. Cl. ..................................... 711/206
(58) Field of Classification Search .......... 711/200–206
See application file for complete search history.

(56) References Cited

U.S. PATENT DOCUMENTS 6,081,833 A * 6/2000 Okamoto et al. ............ 709/213
6,801,993 B2 * 10/2004 Plambeck ................... 711/206
2003/0074541 A1 * 4/2003 Plambeck ................... 711/206

* cited by examiner

*Primary Examiner*—Matt Kim
*Assistant Examiner*—Hamdy S Ahmed
(74) *Attorney, Agent, or Firm*—Steven Chiu, Esq.; Kevin P. Radigan, Esq.; Heslin Rothenberg Farley & Mesiti P.C.

(57) ABSTRACT

A method of translating a virtual address to a real address. A first entry from a first table or other source includes a plurality of second table addressing parameters including a second table origin and a second table length. A second table address is provided by combining the second table origin with a second table index from the virtual address. The second table address is used for indexing into the second table to access a second table entry in the second table. A post-comparing of one or more of the second table addressing parameters with the second table index from the virtual address is performed to form one or more results. The virtual address processing continues using the second table entry if the comparing provides an affirmative result and if the comparing provides a negative result an exception is taken.

20 Claims, 7 Drawing Sheets

INDEXING FOR DYNAMIC ADDRESS TRANSLATION

TECHNICAL FIELD

The present invention relates to translation of virtual addresses to real addresses in a data processing system and more particularly to the use of table offsets as part of the translations.

BACKGROUND OF THE INVENTION

Data processing systems which use virtual addressing are well known. Many data processing systems include, for example, a processing unit (PU) and a storage unit (SU). The processing unit contains the sequencing and processing facilities for instruction execution, interruption action, timing functions, initial program loading and other machine related functions. The storage unit is addressable and provides for high-speed processing of data by the processing unit. The storage unit may be either physically integrated with the processing unit or constructed in stand-alone units.

In general, address spaces reside in the storage unit wherein an address space is a consecutive sequence of integer numbers (or virtual addresses) which together with transformation parameters allow each number to be associated with a location in the storage unit.

When a virtual address is used by a processing unit to access the storage unit, it is first converted, by means of dynamic address translation (DAT), to a real address, and then, by means of prefixing, to an absolute address.

Dynamic address translation uses various levels of tables as mapping parameters. In prior computer systems, the mapping parameters include origin and length of a table and these mapping parameters are typically found in a control register or at a location specified by an access register.

Typically, dynamic address translation uses segment-table designations in different control registers or at locations specified by access registers. The choice is determined by the translation mode. In a typical computer system operating according to published IBM Principles Of Operation, the mode of operation is specified in a current program-status word (PSW). In such systems, four translation modes are available, namely, primary-space mode, secondary-space mode, access-register mode (AR-mode), and home-space mode. Different address spaces are addressable depending on the translation mode.

Dynamic address translation typically translates a virtual address of a computer system to a real address of a storage unit by means of translation tables. The bit string comprising a virtual address is divided into one or more table indexes and may also include a byte or other lower level address. A highest-level first table index is augmented by a first table width starting at a first table origin to form a first address of a first-table entry in the first table. A second table index is augmented by a second table width starting at a second table origin, obtained from the entry of the first table, to form a second address of a second-table entry in the second table. This operation continues until the table indexes of all of the tables have been processed. The entry in the last table forms the real address, when combined with any lower order address, of a location in the storage unit.

For larger tables, a common practice is to include in a higher-level table that designates an entry in a lower-level table, a table-length field indicating the length of the designated lower-level table. Such a table-length field is typically a bit string of n bits. The higher-order n bits of an index are compared to the table-length bits for the corresponding table. If the n bits of the index are less than or equal to the value of the table-length bits, the index is considered valid and processing continues and the translation occurs. If the n bits of the index are greater than the value of the table-length bits, the index is considered invalid and processing does not continue and a processing exception occurs. The processing exception causes a processing interruption so that the translation does not proceed. The storage of a table-length field has the advantage of saving storage that would be allocated for unneeded addresses beyond the end of the table.

As address spaces have grown larger, for example, as is attendant the change from 31-bit addressing architectures to 64-bit architectures, the problem of tables using unneeded address space (sometimes called sparsely populated address space) has become even more of a problem. One proposed solution appears in U.S. Pat. No. 6,801,993. In that patent, in addition to prior checking with a high-order comparison to determine if unneeded higher-order addresses are specified beyond the end of the table, a prior lower-order comparison is also performed to determine if unneeded lower-order addresses occur lower than the table start address (table offset). If the prior low-order comparison indicates that the indexing is at an address equal to or greater than the start address (table offset) of the table, then the indexing is permitted to continue. However, if the prior low-order comparison indicates that the indexing is at an address less than the start address, the index is considered invalid and processing does not continue and a processing exception occurs.

Unfortunately, the low-order comparison prior processing of the U.S. Pat. No. 6,801,993 is always present and hence consumes execution time even when the indexing is at an address equal to or greater than the start address (table offset) of the table. There is a need for improved processing that does not require the prior low-order comparison prior to indexing.

In light of the foregoing background, there is a need for improved indexing in dynamic address translation of indexing systems particularly for sparsely populated address spaces.

SUMMARY OF THE INVENTION

The present invention is a method of translating a virtual address to a real address. A first entry from a first table or other source includes a plurality of second table addressing parameters including a second table origin and a second table length. A second table address is provided by combining the second table origin with a second table index from the virtual address. The second table address is used for indexing into the second table to access a second table entry in the second table. A post-comparing of one or more of the second table addressing parameters with the second table index from the virtual address is performed to form one or more results. The virtual address processing continues using the second table entry if the comparing provides an affirmative result and if the comparing provides a negative result an exception is taken.

In one particular embodiment the first entry includes a second table origin, a second table offset, a second table length and a second table validity indicator. A pre-comparing of the second table length with a second table index from the virtual address and provides a length affirmative result if the second table index is not greater than the second table length and otherwise takes a translate exception. A second table address is provided in response to the length affirmative result by combining the second table origin with a second table index from the virtual address. The indexing into the second table uses the second table address to access a second table entry in the second table. A post-comparing of the second table offset with the second table index from the virtual address and provides an affirmative offset result if the second table offset is not greater than the second table index and otherwise a translate exception is taken. The virtual address processing continues using the second table entry if the comparing provides an affirmative offset result.

The foregoing methods are beneficially employed in an environment using multipart virtual addresses having virtual address parts I1, . . . , Ii, I(i+1), . . . , II, I(I+1) and having a dynamic address translator having mappers M1, . . . , Mi, M(i+1), . . . , MI. Each of the mappers has an indexing table. The mappers are connected with the output of one table as the input for the next table.

In one particular environment, the virtual address has six parts, namely, I1, I2, I3, I4, I5 and I6 and the mappers are M1, M2, M3, M4 and M5 where the virtual part I6 is an unmapped byte address.

The foregoing and other objects, features and advantages of the invention will be apparent from the following detailed description in conjunction with the drawings.

DETAILED DESCRIPTION

Figure 1:
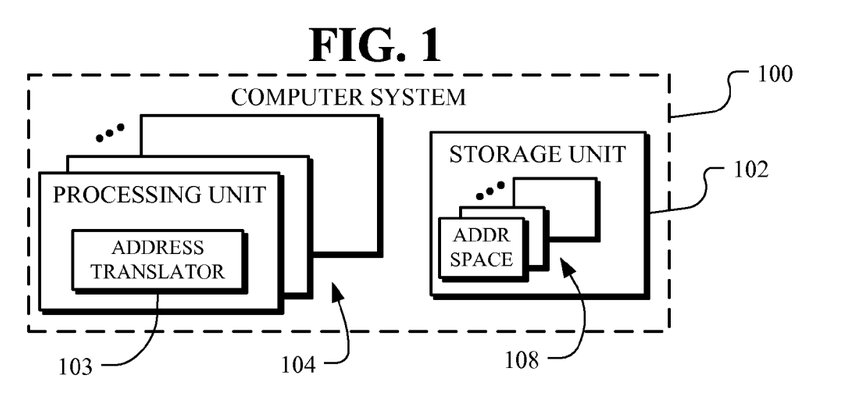
FIG. 1 depicts a schematic block diagram of a computer system having multi-table dynamic address translation (DAT) for virtual addressing.

In FIG. 1, computer system 100 includes a storage 102, one or more processing units (PUs) 104. Storage unit 102 includes one or more address spaces 108 wherein each address space is a consecutive sequence of integer numbers (or virtual addresses) which together with transformation parameters allow each number to be associated with a location in storage. Typically, only that portion of an address space associated with a program or data being used by one or more of the processing units 104 is resident within the storage unit 104.

One or more of the processing units 104 includes an address translator 103 for the dynamic translating of virtual addresses.

Dynamic address translation in computer system 100 typically translates a virtual address to a real address in the storage unit 102 by means of translation tables. A bit string comprising a virtual address is divided into one or more table indexes and may also include a byte or other lower level address. At the highest-level, a first table index is augmented by a first table width starting at a first table origin to form a first address of a first-table entry in the first table. A second table index is augmented by a second table width starting at a second table origin, obtained from the first-table entry obtained from the first table, to form a second address of a second-table entry in the second table. This operation continues from table to table until the table indexes of all of the tables have been processed. The entry obtained from the last table forms the real address which, when combined with any lower order address, is the address of a location in the storage unit 102.

The computer system 100 is representative of many types of multi-table virtual address data processing systems encompassed by the present invention and which are variously described as computing units, computers, processors, nodes, systems, work stations, servers, clients, environments and otherwise. The computer system 100 can be based on a UNIX architecture, an IBM 390 or IBM z/Architecture or other computer architecture.

Figure 2:
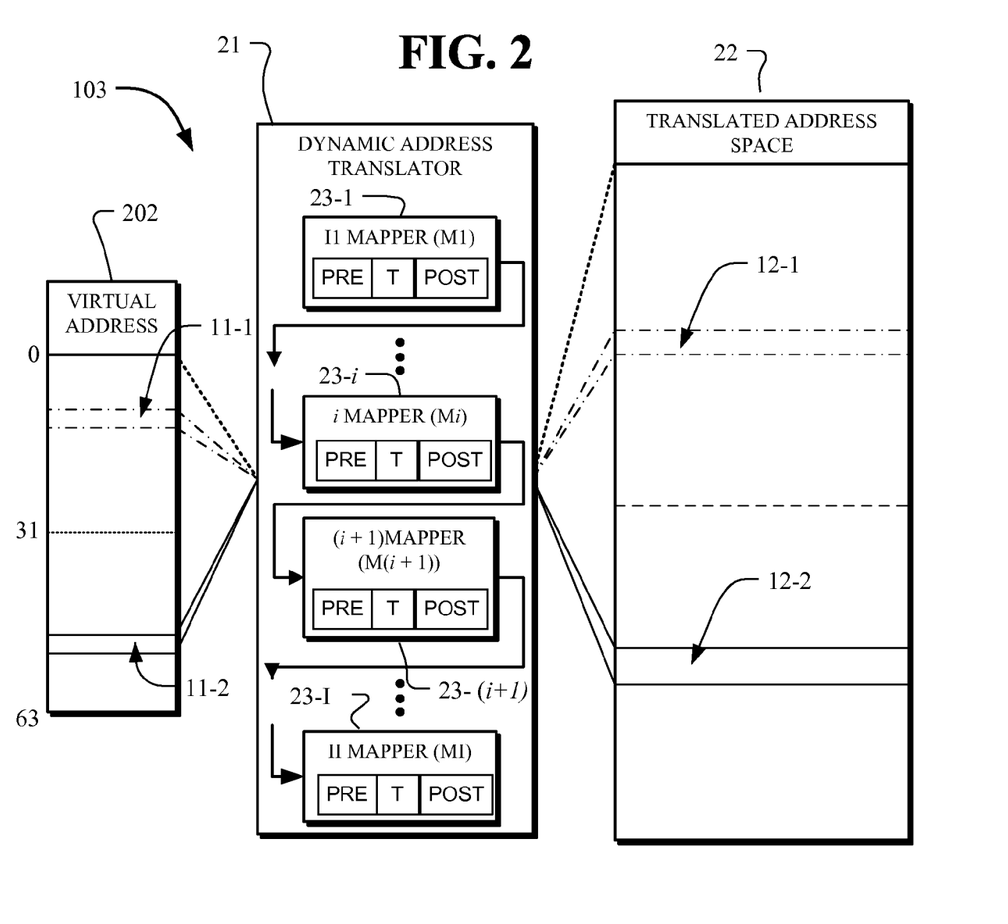
FIG. 2 depicts a schematic block diagram of further details of the multi-table dynamic address translator of the FIG. 1 computer system.

In FIG. 2, the address translator 103 of FIG. 1 includes a multi-table dynamic address translator 21 that functions to translate virtual addresses, such as typical virtual addresses 11-1, 11-2, from the virtual address unit 20, to translated addresses, such as typical translated addresses 12-1, 12-2, in the translated address space 22. The translated address space 22 is within the address spaces 108 of the storage unit 102 of the computer system 100 of FIG. 1. The multi-table dynamic address translator 21 includes a plurality of mappers 23, specifically mappers 23-1, . . . , 23-i, 23-(i+1), . . . 23-I. One or more of the mappers 23 includes an indexing table (T) for assisting in the dynamic address translation. Typically a first entry obtained from a first table in a first mapper (T in i mapper 23-i) is used for indexing into a second table of a next second mapper (T in (i+1) mapper 23-(i+1)). One or more of the mappers 23 includes a pre-comparator (PRE) and/or a post-comparator (POST) for qualifying the indexing. The pre-comparator determines whether the indexing should be performed and the post-comparator determines, after the indexing has occurred, whether the results of the indexing should be discarded.

FIG. 2 is an environment where the virtual addresses 202 have virtual address parts I1, . . . , Ii, I(i+1), . . . , II, I(I+1) and where the dynamic address translator 21 has mappers M1, . . . , Mi, M(i+1), . . . , MI. Each of the mappers has an indexing table (T). The mappers are connected with the output of one table of one mapper as the input for the table in the next mapper.

Figure 3:
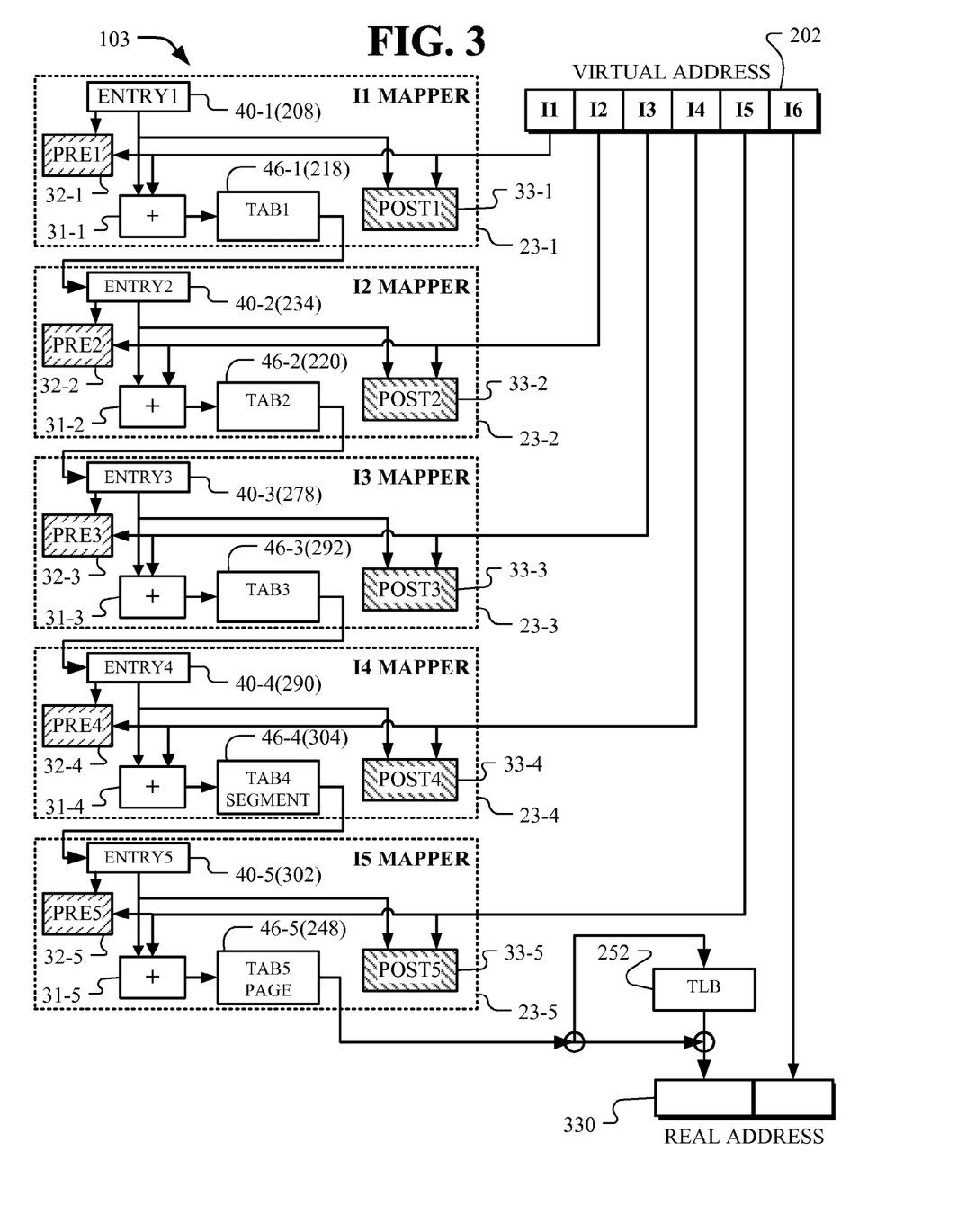
FIG. 3 depicts one embodiment of a typical five table indexing system.

In FIG. 3, address translator 103 includes a five table implementation of the dynamic address translator 21 of FIG. 2. The virtual address 202 is dynamically translated to the real address 330. The target architecture of the FIG. 3 address translator 103 follows the IBM z/Architecture as set forth in IBM's z/Architecture, Principles of Operation, SA22-7832-00 (December 2000) as described in U.S. Pat. No. 6,801,993.

In FIG. 3, according to an example in the target architecture, the virtual address 202 has six parts, namely, I1, I2, I3, I4, I5 and I6 where I1 is for a first region (RFX), I2 is for a second region (RSX), I3 is for a third region (RTX), I4 is for a segment (SX), I5 is for a page (PX) and I6 is a byte address. Each of the parts I1, I2, I3, I4 and I5 of the virtual address 202 is mapped by a corresponding one of the mappers 23-1, 23-2, 23-3, 23-4 and 23-5, respectively. The mappers 23-1, 23-2, 23-3, 23-4 and 23-5 each include a table designated TAB1, TAB2, TAB3, TAB4 and TAB5, respectively, designated 46-1 (218), 46-2(220), 46-3(292), 46-4(304) and 46-5(248) (the parenthesis's corresponding to the similar tables in U.S. Pat. No. 6,801,993). Each of the tables TAB1, TAB2, TAB3, TAB4 and TAB5 holds parts of addresses of other tables. TAB1 holds parts of addresses for addressing TAB2, TAB2 holds parts of addresses for addressing TAB3, TAB3 holds parts of addresses for addressing TAB4, and TAB4 holds parts of addresses for forming the real address 330.

TAB1 is addressed from ENTRY1 address unit 40-1(208). An address part from unit 40-1(208) is combined with an address part from I1 in combiner 31-1 for indexing into TAB1 46-1(218). Prior to indexing into TAB1, a pre-comparison may be performed in PRE1 unit 32-1 to determine if the indexing should proceed. If a pre-comparison is performed and the address range is properly qualified, the indexing proceeds and if not, an exception occurs and the indexing does not proceed. After indexing into TAB1 to obtain an entry from TAB1, a post-comparison may be performed in POST1 unit 33-1 to determine if the entry obtained from indexing into TAB1 should be used. If as a result of the comparison the entry should not be used, an exception occurs. If an exception does not occur from either the PRE1 unit 32-1 or the POST1 unit 33-1, then the entry from TAB1 is stored into ENTRY2 40-2(234) for possible use in indexing into TAB2.

TAB 2 46-2(220) is addressed from ENTRY2 address unit 40-2(234). An address part from unit 40-2 is combined with an address part from I2 in combiner 31-2 for indexing into TAB2. Prior to indexing into TAB2, a pre-comparison may be performed in PRE2 unit 32-2 to determine if the indexing should proceed. If a pre-comparison is performed and the address range is properly qualified, the indexing proceeds and if not, an exception occurs and the indexing does not proceed. After indexing into TAB2 to obtain an entry from TAB2, a post-comparison may be performed in POST2 unit 33-2 to determine if the entry obtained from indexing into TAB2 should be used. If as a result of the comparison the entry should not be used, an exception occurs. If an exception does not occur from either the PRE2 unit 32-2 or the POST2 unit 33-2, then the entry from TAB2 is stored into ENTRY3 (278) for possible use in indexing into TAB3.

TAB3 46-3(292) is addressed from ENTRY3 address unit 40-3(278). An address part from unit 40-2 is combined with an address part from I3 in combiner 31-3 for indexing into TAB3. Prior to indexing into TAB3, a pre-comparison may be performed in PRE3 unit 32-3 to determine if the indexing should proceed. If a pre-comparison is performed and the address range is properly qualified, the indexing proceeds and if not, an exception occurs and the indexing does not proceed. After indexing into TAB3 to obtain an entry from TAB3, a post-comparison may be performed in POST3 unit 33-3 to determine if the entry obtained from indexing into TAB3 should be used. If as a result of the comparison the entry should not be used, an exception occurs. If an exception does not occur from either the PRE3 unit 32-3 or the POST3 unit 33-3, then the entry from TAB3 is stored into ENTRY4 (290) for possible use in indexing into TAB4.

TAB4 46-4(304) is addressed from ENTRY4 address unit 290. An address part from unit 46-4 is combined with an address part from I4 in combiner 31-4 for indexing into TAB4. Prior to indexing into TAB4, a pre-comparison may be performed in PRE4 unit 32-4 to determine if the indexing should proceed. If a pre-comparison is performed and the address range is properly qualified, the indexing proceeds and if not, an exception occurs and the indexing does not proceed. After indexing into TAB4 to obtain an entry from TAB4, a post-comparison may be performed in POST4 unit 33-4 to determine if the entry obtained from indexing into TAB4 should be used. If as a result of the comparison the entry should not be used, an exception occurs. If an exception does not occur from either the PRE4 unit 32-4 or the POST4 unit 33-4, then the entry from TAB4 is stored into ENTRY5 (302) for possible use in indexing into TAB5.

TAB5 46-5(248) is addressed from ENTRY5 address unit 40-5(302). An address part from unit 40-5 is combined with an address part from I5 in combiner 31-5 for indexing into TAB5. Prior to indexing into TAB5, a pre-comparison may be performed in PRE5 unit 32-5 to determine if the indexing should proceed. If a pre-comparison is performed and the address range is properly qualified, the indexing proceeds and if not, an exception occurs and the indexing does not proceed. After indexing into TAB5 to obtain an entry from TAB5, a post-comparison may be performed in POST5 unit 33-5 to determine if the entry obtained from indexing into TAB5 should be used. If as a result of the comparison the entry should not be used, an exception occurs. If an exception does not occur from either the PRE5 unit 32-5 or the POST5 unit 33-5, then the entry from TAB5 is used for indexing into the translation look-aside buffer (TLB) 252 or directly into the real address 330.

When the address translator 103 of FIG. 3 is implemented with the target architecture being the IBM z/Architecture or earlier versions thereof such as the IBM 390 architecture, the translation of a virtual address 202 is controlled by a DAT-mode bit and address-space-control bits in the Program Status Word (PSW) and by the address-space-control elements (AS-CEs) in control registers and as specified by access registers. These components are well-known parts of computer systems operating according to the target architecture.

The ASCE may start the virtual translation at any one of the tables in FIG. 3. Assuming, by way of example, that translation starts with the highest-order table, TAB1, then the sequencing proceeds in order from higher-level (TAB1) to lower-level (TAB5), if an exception is not encountered, through each of the tables TAB1, TAB2, TAB3, TAB4 and TAB5. When the ASCE starts with a lower-level table designation such as TAB2, TAB3 or TAB4, the translation is performed by means of only the tables beginning with and after the designated table. The virtual-address bits that would if nonzero have been associated with the higher level must be all zero; otherwise, an ASCE-type exception is recognized. When the ASCE has a real-space designation, the virtual address is treated as a real address and table entries of FIG. 3 are not used.

The address-space-control element (ASCE) used for a particular address translation is called the effective ASCE. The effective ASCE is comprised of a table origin, a real-space control, a designation type and a table length. Accordingly, when a primary virtual address is translated, the contents of one control register are used as the effective ASCE. Similarly, for a secondary virtual address, the contents of another control register are used; for an AR-specified virtual address, the ASCE specified by the access register is used; and for a home virtual address, the contents of still another control register are used.

The address translator 103 of FIG. 1, FIG. 2 and FIG. 3 operate in the target architecture or in any architecture to perform the dynamic address translation. The particular details of the translation for two successive levels of tables, the i level and the (i+1) level, as performed by operation of i mapper 23-i and the (i+1) mapper 23-(i+1) in FIG. 2 are described in connection with FIG. 4 through FIG. 8 embodiments.

Figure 4:
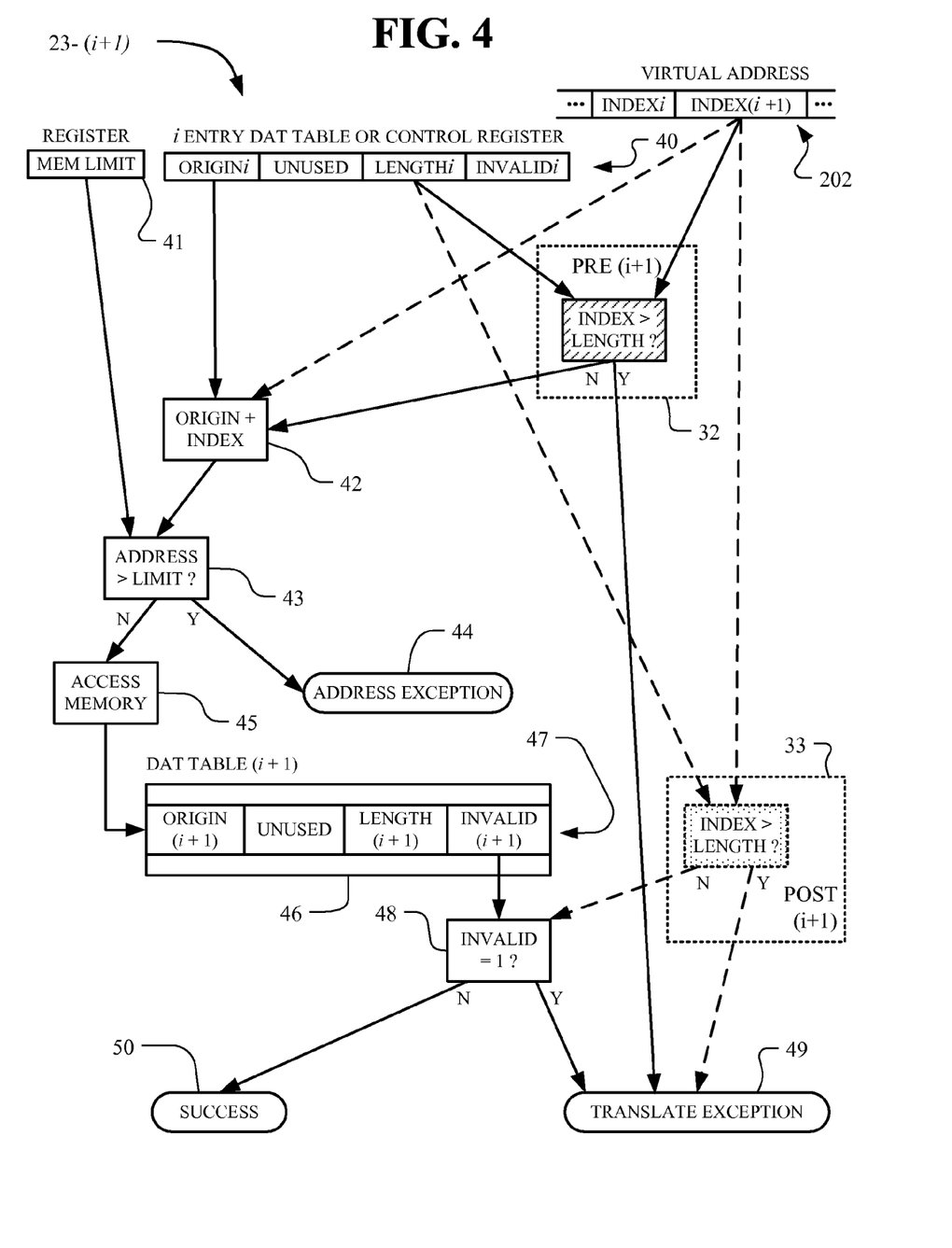
FIG. 4 depicts one embodiment of a portion of the FIG. 3 indexing system for running in a 31-bit architecture with pre-comparing of the table length and the virtual address.

In FIG. 4, an example of the (i+1) mapper 23-(i+1) in FIG. 2 is shown for the target architecture like that of FIG. 3 and limited to 31-bit addressing of the IBM 390 architecture. An entry unit 40 stores an entry from the i mapper 23-i including ORIGINi, LENGTHi, and INVALIDi values which designate the origin address of the (i+1) table 46, the length of the (i+1) table 46 and the validity of the (i+1) table 46, respectively. In FIG. 4, the address register 202 is shown with the INDEXi and INDEX(i+1) values. A pre-comparator 32 performs the PRE(i+1) comparison "INDEX>LENGTH?" of the length LENGTHi value from entry 40 with the INDEX(i+1) value from the virtual address 202. If the index is greater than the length, a Y results and a translate exception 49 occurs. If the index is not greater than the length, a N results and processing continues by combining in combiner 42 the ORIGINi from entry 40 with the INDEX(i+1) value from the virtual address 202 to form a combined address. The combined address from combiner 42 is then compared, "ADDRESS>LIMIT", with the MEM LIMIT address from register 41 in comparator 43. If the combined address is greater than the limit, the result of the compare is Y and an address exception 44 occurs. If the combined address is not greater than the limit, the result of the compare is N and an access 45 of the (i+1) table 46 is made at the location of the combined address. The entry 47 in table 46 includes ORIGIN(i+1), LENGTH(i+1), and INVALID(i+1). The value of the INVALID(i+1) in entry 47 is compared, "INVALID=1?" in comparator 48. If INVALID(i+1) is equal to 1, the result of the compare is Y and an translate exception 49 occurs. If INVALID(i+1) is not equal to 1, the result of the compare is N and success 50 of the translation occurs. The entry 47 is then ready for use for example, in the next 23-(i+2) mapper (not explicitly shown).

In the FIG. 4 example, the POST(i+1) comparator 33 is not used in a first embodiment. In an alternate embodiment, the PRE(i+1) comparator 32 is not used and is replaced with the POST(i+1) comparator 33. In such an alternate embodiment, the INDEX(i+1) value is provided directly to the combiner 42 and the combined address is provided to the comparator 43. The post-comparator 33 performs the POST(i+1) comparison "INDEX>LENGTH?" comparing the length LENGTHi value from entry 40 with the INDEX(i+1) value from the virtual address 202. If the index is greater than the length, a negative qualifying result, Y, causes a translate exception 49 to occur. If the index is not greater than the length, an affirmative qualifying result N results and processing continues by enabling the comparator 48. The value of the INVALID (i+1) in entry 47 is compared, "INVALID=1?" in the enabled comparator 48. If INVALID(i+1) is equal to 1, the result of the compare is a negative qualifying result, Y, and an translate exception 49 occurs. If INVALID(i+1) is not equal to 1, the result of the compare is an affirmative qualifying result, N, and success 50 of the translation occurs. The entry 47 is then ready for use for example, in the next 23-(i+2) mapper (not explicitly shown).

Figure 5:
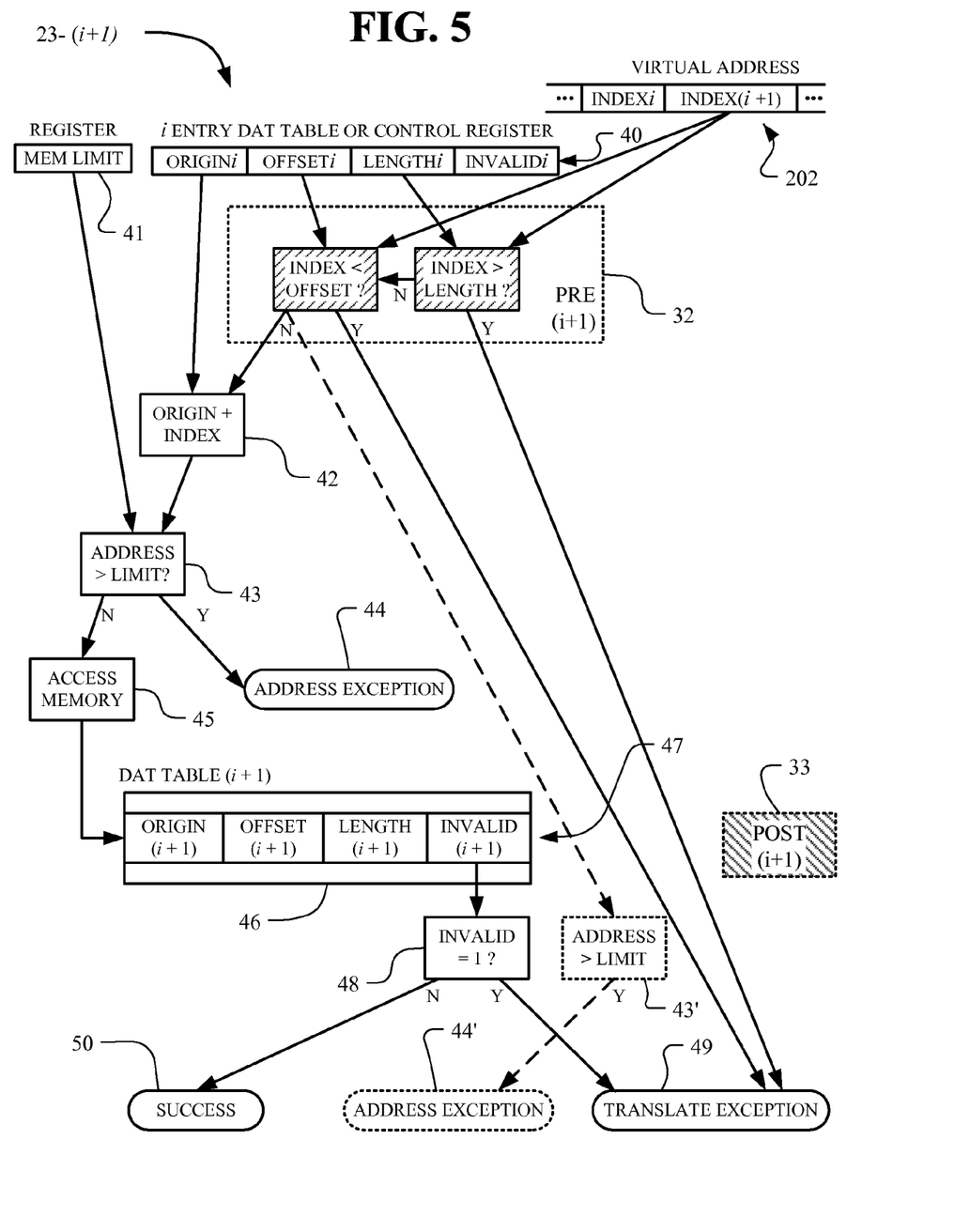
FIG. 5 depicts one embodiment of a portion of the FIG. 3 indexing system for running in a 64-bit architecture with pre-comparing of the index length with the virtual address and the index offset with the virtual address.

In FIG. 5, an example of the (i+1) mapper 23-(i+1) in FIG. 2 is shown for the target architecture like that of FIG. 3 using 64-bit addressing and PRE(i+1) comparisons. An entry unit 40 stores an entry from the i mapper 23-i including ORIGINi, OFFSETi, LENGTHi, and INVALIDi values which designate the origin address of the (i+1) table 46, the offset address of the (i+1) table 46, the length of the (i+1) table 46 and the validity of the (i+1) table 46, respectively. The address register 202 is shown with the INDEXi and INDEX(i+1) values. A pre-comparator 32 performs pre-processing with the PRE(i+1) comparison "INDEX>LENGTH?" of the length LENGTHi value from entry 40 with the INDEX(i+1) value from the virtual address 202. If the index is greater than the length, a Y results and a translate exception 49 occurs. If the index is not greater than the length, an N results and processing continues to an offset comparison. The pre-comparator 32 performs pre-processing with the PRE(i+1) comparison "INDEX<OFFSET?" of the offset OFFSETi value from entry 40 with the INDEX(i+1) value from the virtual address 202. If the index is less than the offset, a Y results and a translate exception 49 occurs. If the offset is not greater than the index, a N results and processing continues by combining in combiner 42 the ORIGINi from entry 40 with the INDEX(i+1) value from the virtual address 202 to form a combined address.

In FIG. 5, the combined address from combiner 42 is then compared, "ADDRESS>LIMIT", with the MEM LIMIT address from register 41 in comparator 43. If the combined address is greater than the limit, the result of the compare is Y and an address exception 44 occurs. If the combined address is not greater than the limit, the result of the compare is N and an access 45 of the (i+1) table 46 is made at the location of the combined address. The entry 47 in table 46 includes ORIGIN (i+1), OFFSET(i+1), LENGTH(i+1), and INVALID(i+1). The value of the INVALID(i+1) in entry 47 is compared, "INVALID=1?" in comparator 48. If INVALID(i+1) is equal to 1, the result of the compare is Y and a translate exception 49 occurs. If INVALID(i+1) is not equal to 1, the result of the compare is N and success 50 of the translation occurs. The entry 47 is then ready for use for example, in the next 23-(i+2) mapper (not explicitly shown). In the FIG. 4 example, the POST(i+1) comparator 33 is not used.

In FIG. 5, an alternate embodiment moves the "ADDRESS>LIMIT" compare 43' having a negative result, Y, to after the indexing into table 46.

Figure 6:
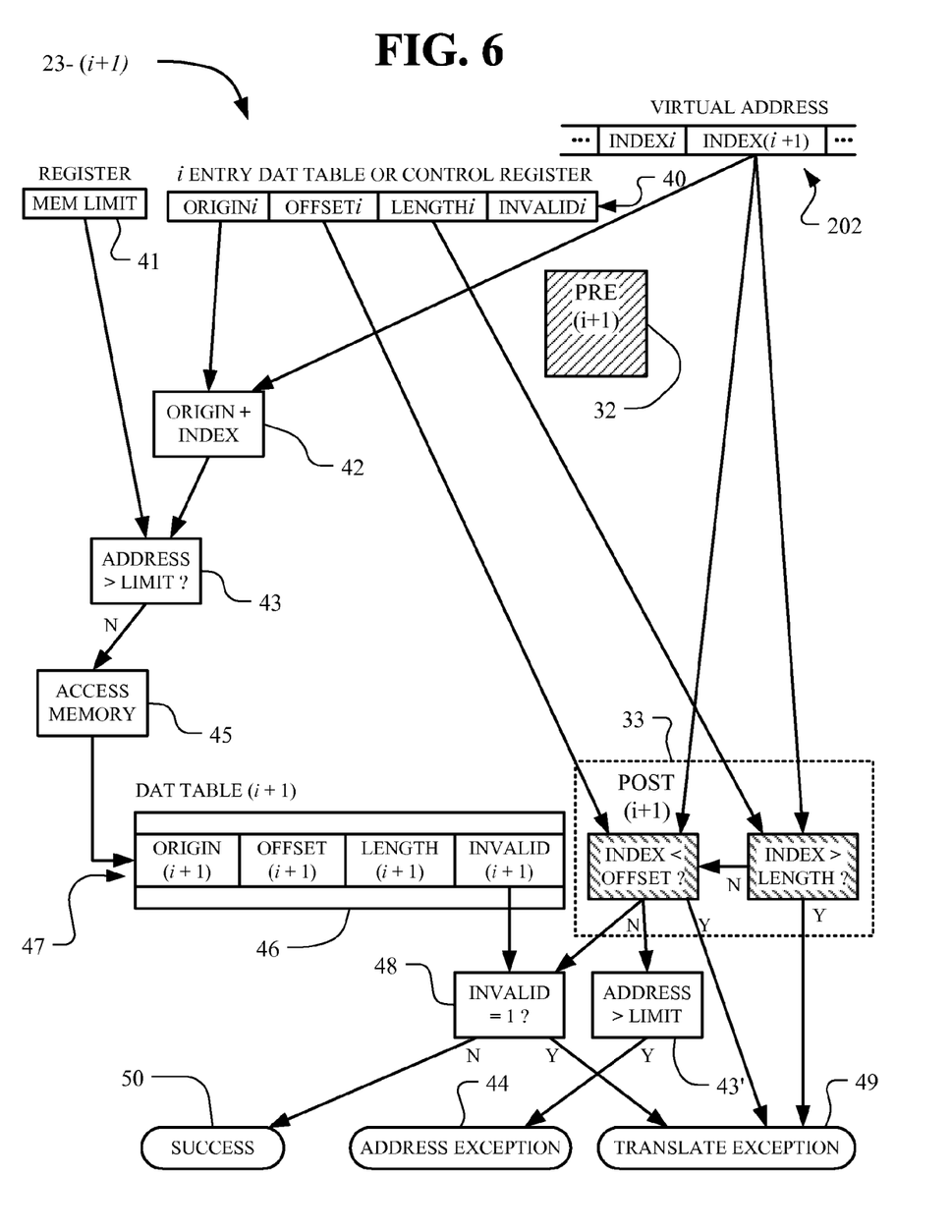
FIG. 6 depicts one embodiment of a portion of the FIG. 3 indexing system for running in a 64-bit architecture with post-comparing of the table index length with the virtual address and the index offset with the virtual address.

In FIG. 6 an example of the (i+1) mapper 23-(i+1) in FIG. 2 is shown for the target architecture like that of FIG. 3 using 64-bit addressing and POST(i+1) comparisons. An entry unit 40 stores an entry from the i mapper 23-i including ORIGINi, OFFSETi, LENGTHi, and INVALIDi values which designate the origin address of the (i+1) table 46, the offset address of the (i+1) table 46, the length of the (i+1) table 46 and the validity of the (i+1) table 46, respectively. The address register 202 is shown with the INDEXi and INDEX(i+1) values. The processing does not use the PRE(i+1) comparator 32 and combiner 42 combines the ORIGINi from entry 40 with the INDEX(i+1) value from the virtual address 202 to form a combined address. The combined address from combiner 42 is then compared, "ADDRESS>LIMIT", with the MEM LIMIT address from register 41 in comparator 43. If the combined address is not greater than the limit, the result of the compare is N and an access 45 of the (i+1) table 46 to access an entry is made at the location of the combined address. The entry 47 in table 46 includes ORIGIN(i+1), OFFSET(i+1), LENGTH(i+1), and INVALID(i+1).

A post-comparator 33 performs the POST(i+1) comparison "INDEX>LENGTH?" of the length LENGTHi value from entry 40 with the INDEX(i+1) value from the virtual address 202. If the index is greater than the length, a Y results and a translate exception 49 occurs. If the index is not greater than the length, an N results and processing continues to an offset comparison. The post-comparator 33 performs the POST(i+1) offset comparison "INDEX<OFFSET?" of the offset OFFSETi value from entry 40 with the INDEX(i+1) value from the virtual address 202. If the index is less than the offset, a Y results and a translate exception 49 occurs. If the offset is not greater than the index, an N results and an invalidity comparison in comparator 48 is performed and an address limit comparison in comparator 43' is performed. For the address limit comparison, the combined address from combiner 42 is compared, "ADDRESS>LIMIT", with the MEM LIMIT address from register 41 in comparator 43'. For the invalidity comparison, the value of the INVALID(i+1) in entry 47 is compared, "INVALID=1?", in comparator 48. If INVALID(i+1) is equal to 1, the result of the compare is Y and a translate exception 49 occurs. If INVALID(i+1) is not equal to 1, the result of the compare is N and success 50 of the translation occurs provided an exception, address exception 44 or translate exception 49, has not occurred. With success 50, the entry 47 is then ready for use for example, in the next 23-(i+2) mapper (not explicitly shown).

Figure 7:
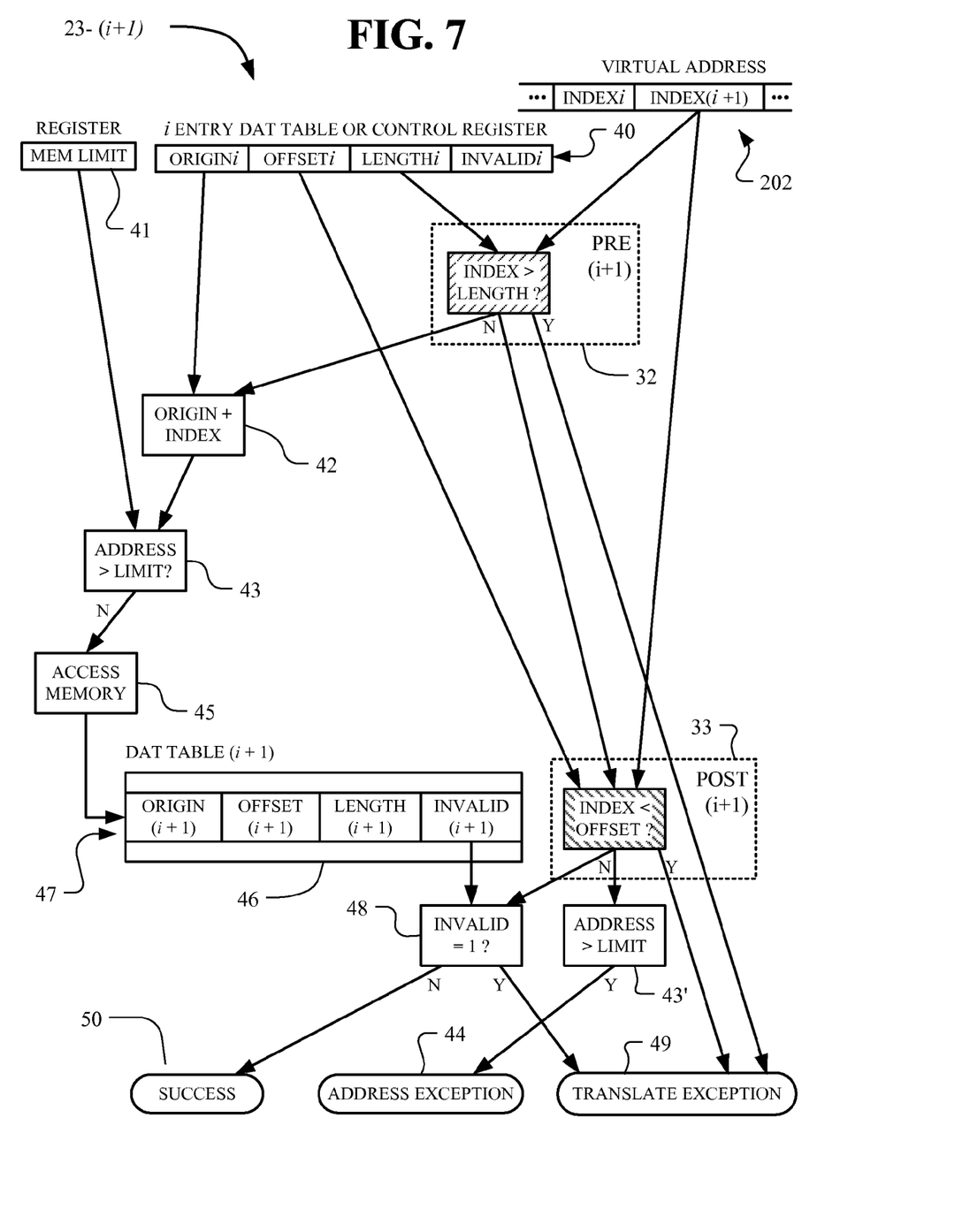
FIG. 7 depicts one embodiment of a portion of the FIG. 3 indexing system for running in a 64-bit architecture with pre-comparing of the table index length with the virtual address and post-comparing of the index offset with the virtual address.

In FIG. 7 an example of the (i+1) mapper 23-(i+1) in FIG. 2 is shown for the target architecture like that of FIG. 3 using 64-bit addressing using PRE(i+1) and POST(i+1) comparisons. An entry unit 40 stores an entry from the i mapper 23-i including ORIGINi, OFFSETi, LENGTHi, and INVALIDi values which designate the origin address of the (i+1) table 46, the offset address of the (i+1) table 46, the length of the (i+1) table 46 and the validity of the (i+1) table 46, respectively. The address register 202 is shown with the INDEXi and INDEX(i+1) values. A pre-comparator 32 performs the PRE(i+1) comparison "INDEX>LENGTH?" of the length LENGTHi value from entry 40 with the INDEX(i+1) value from the virtual address 202. If the index is greater than the length, a Y results and a translate exception 49 occurs. If the index is not greater than the length, an N results and processing continues by combining in combiner 42 the ORIGINi from entry 40 with the INDEX(i+1) value from the virtual address 202 to form a combined address. The processing combines the ORIGINi from entry 40 with the INDEX(i+1) value from the virtual address 202 to form a combined address. The combined address from combiner 42 is then compared, "ADDRESS>LIMIT", with the MEM LIMIT address from register 41 in comparator 43. If the combined address is not greater than the limit, the result of the compare is N and an access 45 of the (i+1) table 46 occurs to obtain an entry at the location of the combined address. The entry 47 in table 46 includes ORIGIN(i+1), OFFSET(i+1), LENGTH(i+1), and INVALID(i+1).

In FIG. 7, after indexing into table 46, a post-comparator 33 performs the POST(i+1) offset comparison "INDEX<OFFSET?" of the offset OFFSETi value from entry 40 with the INDEX(i+1) value from the virtual address 202. If the index is less than the offset, a Y results and a translate exception 49 occurs. If the offset is not greater than the index, an N results and an invalidity comparison in comparator 48 is performed and an address limit comparison in comparator 43' is performed. For the address limit comparison, the combined address from combiner 42 is compared, "ADDRESS>LIMIT", with the MEM LIMIT address from register 41 in comparator 43'. For the invalidity comparison, the value of the INVALID(i+1) in entry 47 is compared, "INVALID=1?", in comparator 48. If INVALID(i+1) is equal to 1, the result of the compare is Y and a translate exception 49 occurs. If INVALID(i+1) is not equal to 1, the result of the compare is N and success 50 of the translation occurs provided an exception, address exception 44 or translate exception 49, has not occurred. With success 50, the entry 47 is then ready for use for example, in the next 23-(i+2) mapper (not explicitly shown).

Figure 8:
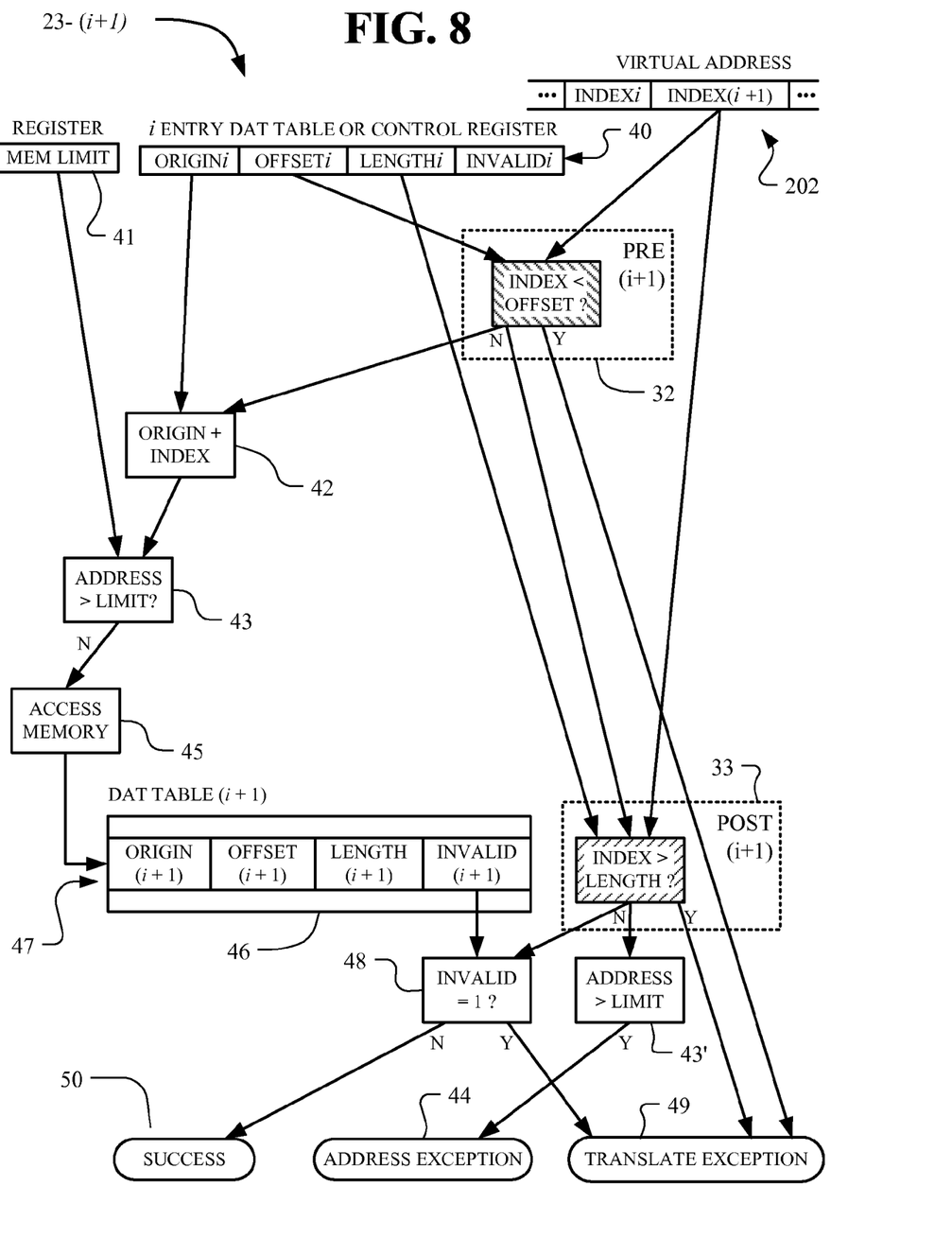
FIG. 8 depicts another embodiment of a portion of the FIG. 3 indexing system for running in a 64-bit architecture with pre-comparing of the table index offset with the virtual address and post-comparing of the index length with the virtual address.

In FIG. 8 another example of the (i+1) mapper 23-(i+1) in FIG. 2 is shown for the target architecture like that of FIG. 3 using 64-bit addressing using PRE(i+1) and POST(i+1) comparisons. An entry unit 40 stores an entry from the i mapper 23-i including ORIGINi, OFFSETi, LENGTHi, and INVALIDi values which designate the origin address of the (i+1) table 46, the offset address of the (i+1) table 46, the length of the (i+1) table 46 and the validity of the (i+1) table 46, respectively. The address register 202 is shown with the INDEXi and INDEX(i+1) values. A pre-comparator 32 performs the PRE(i+1) comparison "INDEX<OFFSET?" of the offset OFFSETi value from entry 40 with the INDEX(i+1) value from the virtual address 202. If the offset is greater than the length, a negative qualifying result, Y, results and a translate exception 49 occurs. If the index is not greater than the length, an affirmative qualifying result, N, occurs and processing continues by combining in combiner 42 the ORIGINi from entry 40 with the INDEX(i+1) value from the virtual address 202 to form a combined address. The processing combines the ORIGINi from entry 40 with the INDEX(i+1) value from the virtual address 202 to form a combined address. The combined address from combiner 42 is then compared, "ADDRESS>LIMIT", with the MEM LIMIT address from register 41 in comparator 43. If the combined address is not greater than the limit, the result of the compare is N and an access 45 of the (i+1) table 46 occurs to obtain an entry at the location of the combined address. The entry 47 in table 46 includes ORIGIN(i+1), OFFSET(i+1), LENGTH(i+1), and INVALID(i+1).

In FIG. 7, after indexing into table 46, a post-comparator 33 performs the POST(i+1) offset comparison "INDEX>LENGTH?" of the LENGTHi value from entry 40 with the INDEX(i+1) value from the virtual address 202. If the index is greater than the length, a negative qualifying result, Y, occurs and a translate exception 49 results. If the index is not greater than the length, an affirmative qualifying result, N, occurs and an invalidity comparison in comparator 48 is performed and an address limit comparison in comparator 43' is performed. For the address limit comparison, the combined address from combiner 42 is compared, "ADDRESS>LIMIT", with the MEM LIMIT address from register 41 in comparator 43'. For the invalidity comparison, the value of the INVALID(i+1) in entry 47 is compared, "INVALID=1?", in comparator 48. If INVALID(i+1) is equal to 1, the result of the compare is a negative qualifying result, Y, and a translate exception 49 occurs. If INVALID(i+1) is not equal to 1, the result of the compare is an affirmative qualifying result, N, and success 50 of the translation occurs provided an exception, address exception 44 or translate exception 49, has not occurred. With success 50, the entry 47 is then ready for use for example, in the next 23-(i+2) mapper (not explicitly shown).

In the examples of FIG. 4 through FIG. 7, the pre-comparisons 32 and the post-comparisons 33 are examples of evaluation of logical expressions that qualify use of the indexed entries. Of course, equivalent logical expressions can be evaluated to achieve the same pre-processing and post-processing. For example, in FIG. 5, the PRE(i+1) pre-processing 32 with comparison "INDEX>LENGTH?" and "INDEX<OFFSET?" can be substituted with the logical equivalent "OFFSET≦INDEX≦LENGTH" and switching the N and Y values. In a further example, in FIG. 6, the POST(i+1) post-processing 33 with comparison "INDEX>LENGTH?" and "INDEX<OFFSET?" can be substituted with the logical equivalent "OFFSET≦INDEX≦LENGTH" and switching the N and Y values.

While the invention has been particularly shown and described with reference to preferred embodiments thereof it will be understood by those skilled in the art that various changes in form and details may be made therein without departing from the scope of the invention.

The invention claimed is:

1. A method of translating a virtual address to a real address, the method comprising:
  providing a first entry from a first table or other source where the first entry includes a plurality of second table addressing parameters including a second table origin and a second table length,
  providing a second table address by combining the second table origin with a second table index from the virtual address,
  indexing into the second table using the second table address to access a second table entry in the second table,
  after indexing into the second table to access the second table entry, post-comparing one or more second table addressing parameters with the second table index from the virtual address to form one or more results, the post-comparing determining whether at least one of an inconsistent table offset or an inconsistent table length is detected between the one or more second address parameters and the second table index from the virtual address, an affirmative result being obtained from the post-comparing if no inconsistent table offset or inconsistent table length is detected, and a negative result being obtained if the at least one of an inconsistent table offset or an inconsistent table length is detected,
  continuing virtual address processing using the second table entry if the comparing provides an affirmative result and causing an exception if the comparing provides a negative result.

2. The method claim 1, wherein said post-comparing step compares the second table length with the second table index from the virtual address and provides a corresponding affirmative result if the second table index is not greater than the second table length.

3. The method claim 1, wherein said second table addressing parameters include a second table offset and said post-comparing step compares the second table offset with the second table index from the virtual address and provides a corresponding affirmative result if the second table offset is not greater than the second table index.

4. The method claim 1, wherein said second table addressing parameters include a second table offset and said post-comparing step compares the second table offset, OFFSET, and the second table length, LENGTH, with the second table index, INDEX, from the virtual address such that if "OFFSET≦INDEX≦LENGTH" a result of the comparison is affirmative and otherwise a result is negative and an exception is taken.

5. The method claim 1, wherein said second table addressing parameters include a second table offset and said post-comparing step,
  compares the second table length with the second table index from the virtual address and provides an affirmative length result if the second table index is not greater than the second table length,
  compares the second table offset with the second table index from the virtual address in response to an affirmative length result and provides an affirmative offset result if the second table offset is not greater than the second table index, and
  wherein said virtual address processing continues in response to said offset affirmative result.

6. The method claim 1 including a pre-comparing step prior to said indexing step, wherein said pre-comparing step compares one or more second table addressing parameters with the second table index from the virtual address to form one or more results and said virtual address processing continues with the step of providing a second table address in response to an affirmative result and provides an exception in response to a negative result.

7. The method claim 6, wherein said pre-comparing step compares the second table length with the second table index from the virtual address and provides a corresponding affirmative result if the second table index is not greater than the second table length and otherwise provides a negative result.

8. The method claim 6, wherein said second table addressing parameters include a second table offset and said pre-comparing step compares the second table offset with the second table index from the virtual address and provides a corresponding affirmative result if the second table offset is not greater than the second table index and otherwise provides a negative result.

9. The method of claim 1, wherein the virtual address comprises one or more regions, each region being mapped during the translating by a corresponding mapper, each mapper comprising a respective table.

10. The method of claim 9, wherein the virtual address comprises multiple regions.

11. The method of claim 10, wherein the virtual address comprises multiple parts, the multiple parts comprising the multiple regions, a segment, a page and a byte address.

12. A method of translating a virtual address to a real address, the method comprising:
  providing a first entry from a first table or other source where the first entry includes a second table origin, a second table offset, a second table length and a second table validity indicator,
  pre-comparing the second table length with a second table index from the virtual address and providing a length affirmative result if the second table index is not greater than the second table length and otherwise taking a translate exception,
  providing a second table address in response to the length affirmative result by combining the second table origin with a second table index from the virtual address,
  indexing into the second table using the second table address to access a second table entry in the second table,
  after indexing into the second table to access the second table entry, post-comparing the second table offset with the second table index from the virtual address and providing an affirmative offset result if the second table offset is not greater than the second table index and otherwise taking a translate exception,
  continuing virtual address processing using the second table entry if the post-comparing provides an affirmative offset result and causing an exception if the post-comparing provides a negative offset result.

13. A computer system for translating a virtual address to a real address, the computer system comprising:
  a storage unit; and
  a processing unit in communications with the storage unit, wherein the computer system is capable of performing a method, said method comprising:
    providing a first entry from a first table or other source where the first entry includes a plurality of second table addressing parameters including a second table origin and a second table length,
    providing a second table address by combining the second table origin with a second table index from the virtual address, indexing into the second table using the second table address to access a second table entry in the second table, after indexing into the second table to access the second table entry, post-comparing one or more second table addressing parameters with the second table index from the virtual address to form one or more results, the post-comparing determining whether at least one of an inconsistent table offset or an inconsistent table length is detected between the one or more second address parameters and the second table index from the virtual address, an affirmative result being obtained from the post-comparing if no inconsistent table offset or inconsistent table length is detected, and a negative result being obtained if the at least one of an inconsistent table offset or an inconsistent table length is detected, continuing virtual address processing using the second table entry if the comparing provides an affirmative result and causing an exception if the comparing provides a negative result.

14. The computer system of claim 13, wherein said post-comparing step compares the second table length with the second table index from the virtual address and provides a corresponding affirmative result if the second table index is not greater than the second table length.

15. The computer system of claim 13, wherein said second table addressing parameters include a second table offset and said post-comparing step compares the second table offset with the second table index from the virtual address and provides a corresponding affirmative result if the second table offset is not greater than the second table index.

16. The computer system of claim 13, wherein said second table addressing parameters include a second table offset and said post-comparing step compares the second table offset, OFFSET, and the second table length, LENGTH, with the second table index, INDEX, from the virtual address such that if "OFFSET≦INDEX≦LENGTH" a result of the comparison is affirmative and otherwise a result is negative and an exception is taken.

17. The computer system of claim 13, wherein said second table addressing parameters include a second table offset and said post-comparing step,
compares the second table length with the second table index from the virtual address and provides an affirmative length result if the second table index is not greater than the second table length,
compares the second table offset with the second table index from the virtual address in response to an affirmative length result and provides an affirmative offset result if the second table offset is not greater than the second table index, and
wherein said virtual address processing continues in response to said offset affirmative result.

18. The computer system of claim 13, further including a pre-comparing step prior to said indexing step, wherein said pre-comparing step compares one or more second table addressing parameters with the second table index from the virtual address to form one or more results and said virtual address processing continues with the step of providing a second table address in response to an affirmative result and provides an exception in response to a negative result.

19. The computer system of claim 18, wherein said pre-comparing step compares the second table length with the second table index from the virtual address and provides a corresponding affirmative result if the second table index is not greater than the second table length and otherwise provides a negative result.

20. The computer system of claim 18, wherein said second table addressing parameters include a second table offset and said pre-comparing step compares the second table offset with the second table index from the virtual address and provides a corresponding affirmative result if the second table offset is not greater than the second table index and otherwise provides a negative result.

* * * * *